United States Patent
Choi et al.

(10) Patent No.: US 11,355,043 B1
(45) Date of Patent: Jun. 7, 2022

(54) DYNAMICALLY DRIVING MULTIPLE PORTIONS OF DISPLAY DEVICE WITH DIFFERENT DUTY CYCLES

(71) Applicant: Facebook Technologies, LLC, Menlo Park, CA (US)

(72) Inventors: Min Hyuk Choi, San Jose, CA (US); Wenhao Qiao, Milpitas, CA (US); Donghee Nam, San Jose, CA (US); Wonjae Choi, San Jose, CA (US); Zhiming Zhuang, Sammamish, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/179,220

(22) Filed: Feb. 18, 2021

(51) Int. Cl.
*G09G 3/06* (2006.01)
*G02B 27/01* (2006.01)
*G02B 27/00* (2006.01)
*G06F 3/01* (2006.01)

(52) U.S. Cl.
CPC ........... *G09G 3/06* (2013.01); *G02B 27/0093* (2013.01); *G02B 27/0172* (2013.01); *G06F 3/013* (2013.01); *G06F 3/017* (2013.01); *G02B 2027/0178* (2013.01); *G09G 2320/0686* (2013.01)

(58) Field of Classification Search
CPC .. G09G 2320/0686; G09G 3/06; G06F 3/017; G06F 3/013; G02B 2027/178; G02B 27/0172; G02B 27/0093
See application file for complete search history.

(56) References Cited

U.S. PATENT DOCUMENTS

| | | | | |
|---|---|---|---|---|
| 9,558,721 | B2 * | 1/2017 | Sakariya | G09G 3/20 |
| 9,665,171 | B1 * | 5/2017 | Skogo | G06F 3/013 |
| 2008/0143729 | A1 * | 6/2008 | Wyatt | G09G 5/18 345/501 |
| 2016/0267716 | A1 * | 9/2016 | Patel | G06T 19/20 |
| 2017/0236466 | A1 * | 8/2017 | Spitzer | G09G 3/2085 345/560 |
| 2019/0355332 | A1 * | 11/2019 | Knez | G09G 3/2092 |
| 2021/0096644 | A1 * | 4/2021 | Wang | H04N 19/86 |
| 2021/0141449 | A1 * | 5/2021 | Zhang | G06F 3/013 |
| 2021/0174768 | A1 * | 6/2021 | Jarvenpaa | G06F 3/013 |

* cited by examiner

*Primary Examiner* — Mihir K Rayan
(74) *Attorney, Agent, or Firm* — Fenwick & West LLP

(57) ABSTRACT

Embodiments relate to a display device including pixels arranged in rows and columns, where duty cycles of the pixels are dynamically programmed according to eye tracking information. For a display frame, the display device may determine a gaze region and a non-gaze region based on the eye tracking information. A control circuit of the display device controls a first subset of pixels in the gaze region to operate with a first duty cycle and controls a second subset of pixels in the non-gaze region to operate with a second duty cycle greater than the first duty cycle. The first subset of pixels emits light with greater brightness than the second subset of pixels.

20 Claims, 9 Drawing Sheets

300

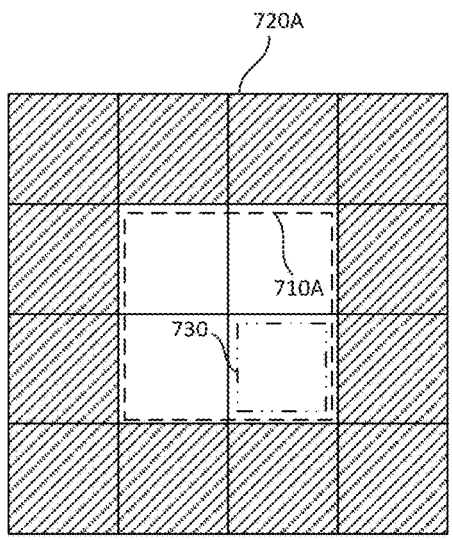
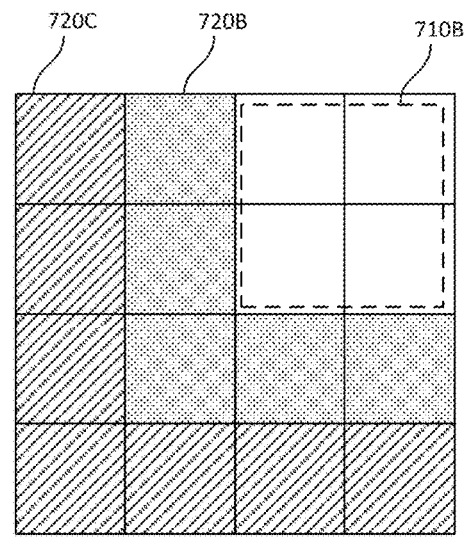
FIG. 7A
FIG. 7B

DYNAMICALLY DRIVING MULTIPLE PORTIONS OF DISPLAY DEVICE WITH DIFFERENT DUTY CYCLES

BACKGROUND

This disclosure relates to a display device, and specifically to driving different portions of a display device by dynamically adjusting duty cycles of pixels during a display frame.

A display device is often used in a virtual reality (VR) or augmented-reality (AR) system as a head-mounted display (HMD) or a near-eye display (NED). The display device may include an array of OLED pixels that emits light. To display a high-resolution image, the display device may include a large number of pixels in the array, which may result in high power consumption. To reduce power consumption in the display device, a portion of the pixels in the array may be operated with reduced brightness. Since users are more likely to focus on pixels in the center region than pixels in the peripheral region, the pixels in the center region may be operated to be brighter than the pixels in the peripheral region. However, when the pixels in the center region are consistently supplied with higher current to emit brighter light compared to the pixels in the peripheral region, the pixels in the center region may have a lower lifetime due to heavier usage.

SUMMARY

Embodiments relate to a display device including a display element with a plurality of pixels where a first subset of pixels corresponding to a gaze region of a user is operated with a first duty cycle and a second subset of pixels corresponding to a non-gaze regions is operated with a second duty cycle greater than the first duty cycle during a display frame. The first subset of pixels is operated to be brighter than the second subset of pixels since the user's eyes are more sensitive to luminance in the first subset of pixels that are in the gaze region. When the user's eyes move, the gaze region and the one or more non-gaze regions may include different subsets of pixels. In a subsequent display frame, the duty cycles for the plurality of pixels are updated according to the updated gaze region and the updated non-gaze region.

In some embodiments, the display device includes an eye tracking system that monitors the motion of the user's eyes and determines the gaze region based on the motion. The display device may include an address decoder that determines one or more rows of pixels corresponding to the gaze region and a plurality of source drivers that determine one or more columns of pixels corresponding to the gaze region. The address decoder and the plurality of source drivers provide input signals to a plurality of latches that sets duty cycles for the pixels in the display device.

BRIEF DESCRIPTION OF DRAWINGS

Figure (FIG. 1 is a diagram of a head-mounted display (HMD) that includes a near-eye display (NED), according to some embodiments.

FIGS. 7A and 7B illustrate example gaze regions and non-gaze regions, according to some embodiments.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Near-Eye Display

Figure 1:
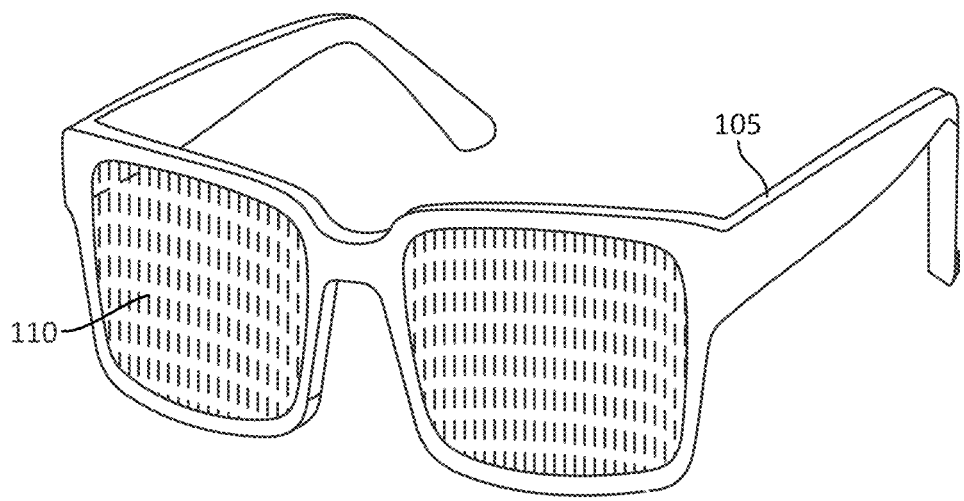

FIG. 1 is a diagram of a near-eye-display (NED) 100, in accordance with some embodiments. The NED 100 may present media to a user. Examples of media that may be presented by the NED 100 include one or more images, video, audio, or some combination thereof. In some embodiments, audio may be presented via an external device (e.g., speakers and/or headphones) that receives audio information from the NED 100, a console (not shown), or both, and presents audio data to the user based on the audio information. The NED 100 is generally configured to operate as a virtual reality (VR) NED. However, in some embodiments, the NED 100 may be modified to also operate as an augmented reality (AR) NED, a mixed reality (MR) NED, or some combination thereof. For example, in some embodiments, the NED 100 may augment views of a physical, real-world environment with computer-generated elements (e.g., still images, video, sound, etc.).

The NED 100 shown in FIG. 1 may include a frame 105 and a display 110. The frame 105 may include one or more optical elements that together display media to a user. That is, the display 110 may be configured for a user to view the content presented by the NED 100. As discussed below in conjunction with FIG. 2, the display 110 may include at least one source assembly to generate image light to present optical media to an eye of the user. The source assembly may include, e.g., a source, an optics system, or some combination thereof.

FIG. 1 is merely an example of a virtual reality system, and the display systems described herein may be incorporated into further such systems. In some embodiments, FIG. 1 may also be referred to as a Head-Mounted-Display (HMD).

Figure 2:
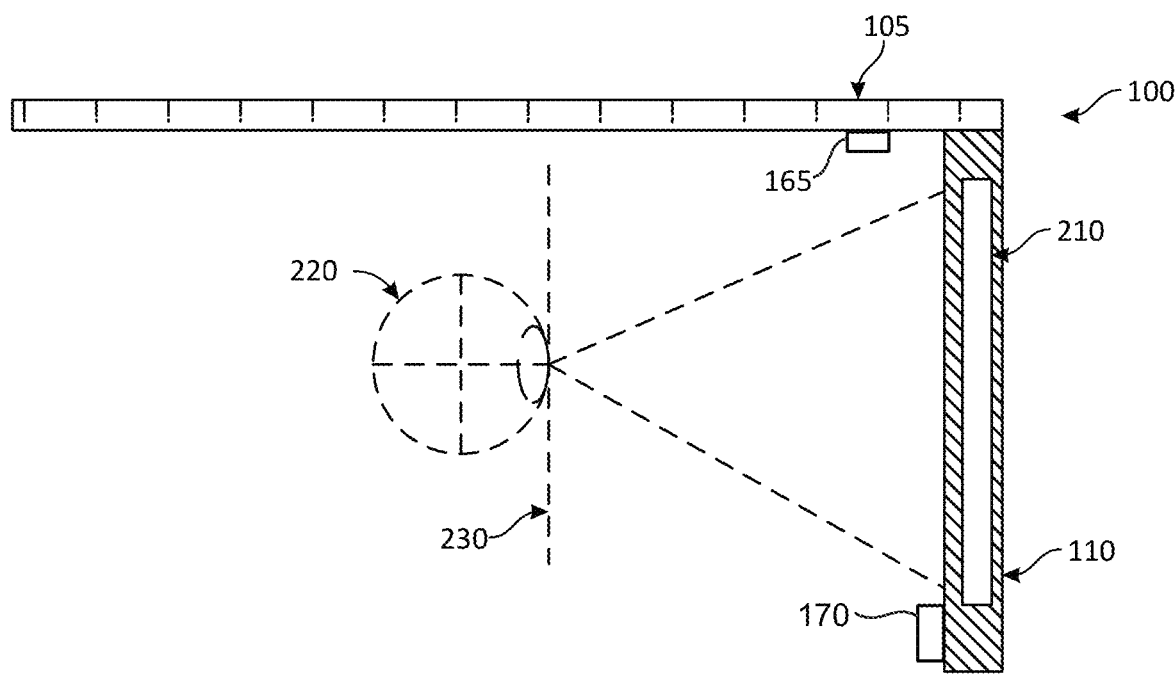
FIG. 2 is a cross-sectional view of the HMD illustrated in FIG. 1, according to some embodiments.

FIG. 2 is a cross section 200 of the NED 100 illustrated in FIG. 1, in accordance with some embodiments of the present disclosure. The cross section 200 may include at least one display assembly 210, and an exit pupil 230. The exit pupil 230 is a location where the eye 220 may be positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly that is separate from or integrated with the display assembly 210 shown in FIG. 2, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the NED 100.

In alternate configurations, the NED 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as an organic light-emitting diode (OLED).

In some embodiments, the NED 100 includes an eye tracking system. The eye tracking system includes a light source 165 and an eye tracker 170. For the purpose of illustration, FIG. 2 shows the cross section 200 associated with a single eye 220, but in some embodiments, another light source 165 and another eye tracker 170 can be included for another eye 220. Moreover, in some embodiments, the NED 100 may include additional light sources and/or eye tracking systems for one or both eyes.

The eye tracking system determines eye tracking information for the user's eye 220. The determined eye tracking information may comprise information about a position of the user's eye 220, e.g., information about an angle of an eye-gaze. As mentioned above, the eye tracking system includes one or more light sources such as the light source 165. The light source 165 is configured to emit light at a particular wavelength or within a particular band of wavelengths. For example, light source 165 may be configured to emit light in the infrared band (~750 nm to 1700 nm), in a visible band (~380 nm to 750 nm), in the ultraviolet band (300 nm to 380 nm), or some other portion of the electromagnetic spectrum. The light source 165 may be configured to emit light in a sub-division of a band, e.g., in the near-infrared band, the short-wavelength infrared band, or a particular color of visible light, or at a particular wavelength. The light source 165 may be, for example, laser diodes (e.g., edge emitters), inorganic or organic LEDs, vertical-cavity surface-emitting lasers (VCSELs), or some other source. In some embodiments, one or more of the light sources may emit structured light. Structured light is light that can be used to determine depth information by allowing the correspondence between the light source, angular position on the object, and the camera position. Structured light may include, e.g., a pattern of dots, a pattern of lines, a pattern of sinusoids, some other light that can be used to determine depth information, or some combination thereof.

A single light source 165 or multiple light sources may be included. The light source(s) may be positioned outside of the user's typical line of sight. For example, the light source(s) may be embedded in the frame 105, as shown in FIG. 2. Using multiple light sources may provide more illumination than a single light source. Using multiple light sources may help ensure that the eye tracker 170 can receive a good view of the eye under a range of conditions, e.g., for users with different facial geometries, or throughout a range of potential eye directions. In some embodiments, additional light sources may be included elsewhere on the frame 105 and/or the light source 165 may be located elsewhere on the frame 105.

The eye tracker 170 receives light that is emitted from the light source 165 and reflected off of the eye 220. The eye tracker 170 includes one or more cameras that capture images of the received light. The eye tracker 170 or an external controller analyze the captured images to determine eye position. The determined eye position may be used to determine, e.g., a point of gaze of the user, track motion of the eye 220 of the user (i.e., eye movement), etc.

As shown in FIG. 2, the eye tracker 170 is embedded into the frame 105. In some embodiments, the eye tracker 170 is hidden from view of the eye 220. In some embodiments, the eye 220 may be able to view at least part of the eye tracker 170, but by locating the eye tracker 170 in or near the frame 105, the eye tracker 170 does not obstruct the vision of the user, and may be less distracting than if the eye tracker 170 were closer to the optical axis.

As shown in FIG. 2, the eye tracker 170 can be embedded in an upper portion of the frame 105. However, in some embodiments, the eye tracker 170 may be located elsewhere on the frame 105. While only one eye tracker 170 is shown in FIG. 2, the NED 100 may include multiple eye trackers 170 per eye 220. For example, different eye trackers 170 may be embedded in different parts of the frame 105. Using multiple eye trackers 170 per eye 155 may increase the accuracy of the eye tracking, and provides redundancy in case an eye tracker 170 or a component of the eye tracker 170 breaks, becomes dirty, is blocked, or otherwise has diminished functionality.

Figure 3:
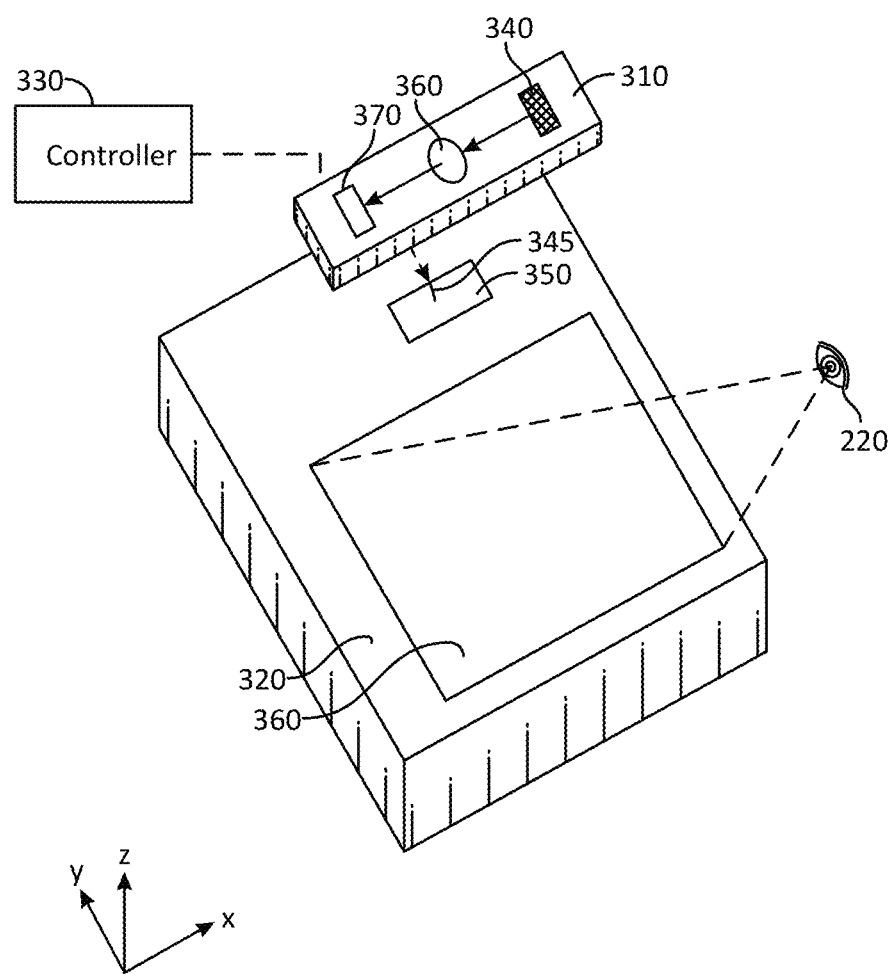
FIG. 3 illustrates a perspective view of a waveguide display, according to some embodiments.

FIG. 3 illustrates a perspective view of a waveguide display 300 in accordance with some embodiments. The waveguide display 300 may be a component (e.g., display assembly 210) of NED 100. In alternate embodiments, the waveguide display 300 may constitute a part of some other NED, or other system that directs display image light to a particular location.

The waveguide display 300 may include, among other components, a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, for instance, one or more components may be shared between waveguide displays for each eye.

The source assembly 310 generates image light. The source assembly 310 may include a source 340, a light conditioning assembly 360, and a scanning mirror assembly 370. The source assembly 310 may generate and output image light 345 to a coupling element 350 of the output waveguide 320.

The source 340 may include a source of light that generates at least a coherent or partially coherent image light 345. The source 340 may emit light in accordance with one or more illumination parameters received from the controller 330. The source 340 may include one or more source elements, including, but not restricted to light emitting diodes, such as micro-OLEDs, as described in detail below with reference to FIGS. 4-10.

The output waveguide 320 may be configured as an optical waveguide that outputs image light to an eye 220 of a user. The output waveguide 320 receives the image light 345 through one or more coupling elements 350 and guides the received input image light 345 to one or more decoupling elements 360. In some embodiments, the coupling element 350 couples the image light 345 from the source assembly 310 into the output waveguide 320. The coupling element 350 may be or include a diffraction grating, a holographic grating, some other element that couples the image light 345 into the output waveguide 320, or some combination thereof. For example, in embodiments where the coupling element 350 is a diffraction grating, the pitch of the diffraction grating may be chosen such that total internal reflection occurs, and the image light 345 propagates internally toward the decoupling element 360. For example, the pitch of the diffraction grating may be in the range of approximately 300 nm to approximately 600 nm.

The decoupling element 360 decouples the total internally reflected image light from the output waveguide 320. The decoupling element 360 may be or include a diffraction grating, a holographic grating, some other element that decouples image light out of the output waveguide 320, or some combination thereof. For example, in embodiments where the decoupling element 360 is a diffraction grating, the pitch of the diffraction grating may be chosen to cause incident image light to exit the output waveguide 320. An orientation and position of the image light exiting from the output waveguide 320 may be controlled by changing an orientation and position of the image light 345 entering the coupling element 350.

The output waveguide 320 may be composed of one or more materials that facilitate total internal reflection of the image light 345. The output waveguide 320 may be composed of, for example, silicon, glass, or a polymer, or some combination thereof. The output waveguide 320 may have a relatively small form factor such as for use in a head-mounted display. For example, the output waveguide 320 may be approximately 30 mm wide along an x-dimension, 50 mm long along a y-dimension, and 0.5-1 mm thick along a z-dimension. In some embodiments, the output waveguide 320 may be a planar (2D) optical waveguide.

The controller 330 may be used to control the scanning operations of the source assembly 310. In certain embodiments, the controller 330 may determine scanning instructions for the source assembly 310 based at least on one or more display instructions. Display instructions may include instructions to render one or more images. In some embodiments, display instructions may include an image file (e.g., bitmap). The display instructions may be received from, e.g., a console of a virtual reality system (not shown). Scanning instructions may include instructions used by the source assembly 310 to generate image light 345. The scanning instructions may include, e.g., a type of a source of image light (e.g. monochromatic, polychromatic), a scanning rate, an orientation of scanning mirror assembly 370, and/or one or more illumination parameters, etc. The controller 330 may include a combination of hardware, software, and/or firmware not shown here so as not to obscure other aspects of the disclosure.

According to some embodiments, source 340 may include a light emitting diode (LED), such as an organic light emitting diode (OLED). An organic light-emitting diode (OLED) is a light-emitting diode (LED) having an emissive electroluminescent layer that may include a thin film of an organic compound that emits light in response to an electric current. The organic layer is typically situated between a pair of conductive electrodes. One or both of the electrodes may be transparent.

As will be appreciated, an OLED display can be driven with a passive-matrix (PMOLED) or active-matrix (AMOLED) control scheme. In a PMOLED scheme, each row (and line) in the display may be controlled sequentially, whereas AMOLED control typically uses a thin-film transistor backplane to directly access and switch each individual pixel on or off, which allows for higher resolution and larger display areas.

Figure 4:
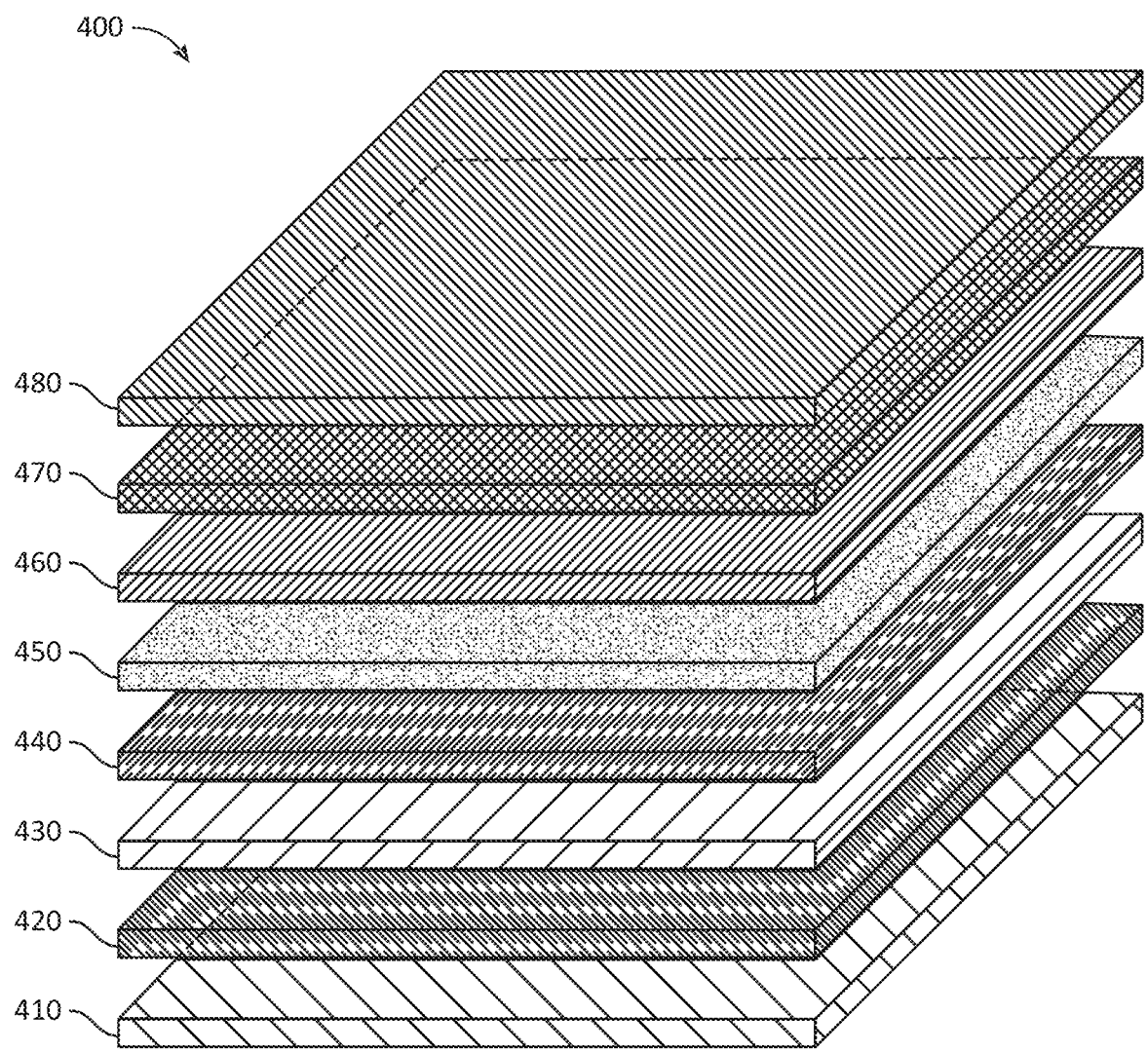
FIG. 4 depicts a simplified organic light-emitting diode (OLED) structure, according to some embodiments.

FIG. 4 depicts a simplified OLED structure according to some embodiments. As shown in an exploded view, OLED 400 may include, from bottom to top, a substrate 410, anode 420, hole injection layer 430, hole transport layer 440, emissive layer 450, blocking layer 460, electron transport layer 470, and cathode 480. In some embodiments, substrate (or backplane) 410 may include single crystal or polycrystalline silicon or other suitable semiconductor (e.g., germanium).

Anode 420 and cathode 480 may include any suitable conductive material(s), such as transparent conductive oxides (TCOs, e.g., indium tin oxide (ITO), zinc oxide (ZnO), and the like). The anode 420 and cathode 480 are configured to inject holes and electrons, respectively, into one or more organic layer(s) within emissive layer 450 during operation of the device.

The hole injection layer 430, which is disposed over the anode 420, receives holes from the anode 420 and is configured to inject the holes deeper into the device, while the adjacent hole transport layer 440 may support the transport of holes to the emissive layer 450. The emissive layer 450 converts electrical energy to light. Emissive layer 450 may include one or more organic molecules, or light-emitting fluorescent dyes or dopants, which may be dispersed in a suitable matrix as known to those skilled in the art.

Blocking layer 460 may improve device function by confining electrons (charge carriers) to the emissive layer 450. Electron transport layer 470 may support the transport of electrons from the cathode 480 to the emissive layer 450.

In some embodiments, the generation of red, green, and blue light (to render full-color images) may include the formation of red, green, and blue OLED sub-pixels in each pixel of the display. Alternatively, the OLED 400 may be adapted to produce white light in each pixel. The white light may be passed through a color filter to produce red, green, and blue sub-pixels.

Any suitable deposition process(es) may be used to form OLED 400. For example, one or more of the layers constituting the OLED may be fabricated using physical vapor deposition (PVD), chemical vapor deposition (CVD), evaporation, spray-coating, spin-coating, atomic layer deposition (ALD), and the like. In further aspects, OLED 400 may be manufactured using a thermal evaporator, a sputtering system, printing, stamping, etc.

According to some embodiments, OLED 400 may be a micro-OLED. A "micro-OLED," in accordance with various examples, may refer to a particular type of OLED having a small active light emitting area (e.g., less than 2,000 µm2 in some embodiments, less than 20 µm2 or less than 10 µm2 in other embodiments). In some embodiments, the emissive surface of the micro-OLED may have a diameter of less than approximately 2 µm. Such a micro-OLED may also have collimated light output, which may increase the brightness level of light emitted from the small active light emitting area.

Figure 5:
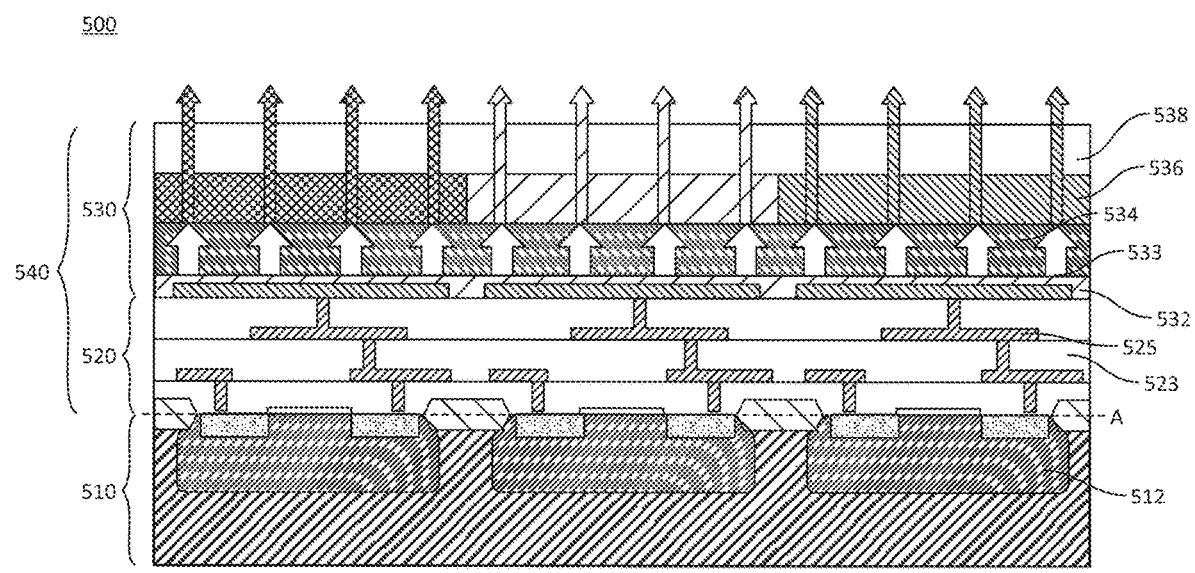
FIG. 5 is a schematic view of an OLED display device architecture including a display driver integrated circuit (DDIC), according to some embodiments.

FIG. 5 is a schematic view of an OLED display device architecture including a display driver integrated circuit (DDIC) 510 according to some embodiments. According to some embodiments, OLED display device 500 (e.g., micro-OLED chip) may include a display active area 530 having an active matrix 532 (such as OLED 400) disposed over a single crystal (e.g., silicon) backplane 520. The combined display/backplane architecture, i.e., display element 540 may be bonded (e.g., at or about interface A) directly or indirectly to the DDIC 510. As illustrated in FIG. 5, DDIC 510 may include an array of driving transistors 512, which may be formed using conventional CMOS processing. One or more display driver integrated circuits may be formed over a single crystal (e.g., silicon) substrate.

In some embodiments, the display active area 530 may have at least one areal dimension (i.e., length or width) greater than approximately 1.3 inches, e.g., approximately 1.4, 1.5, 1.6, 1.7, 1.8, 1.9, 2.0, 2.25, 2.5, 2.75, or 3 inches, including ranges between any of the foregoing values, although larger area displays are contemplated.

Backplane 520 may include a single crystal or polycrystalline silicon layer 523 having a through silicon via 525 for electrically connecting the DDIC 510 with the display active area 530. In some embodiments, display active area 530 may further include a transparent encapsulation layer 534 disposed over an upper emissive surface 533 of active matrix 532, a color filter 536, and cover glass 538.

According to various embodiments, the display active area 530 and underlying backplane 520 may be manufactured separately from, and then later bonded to, DDIC 510, which may simplify formation of the OLED active area, including formation of the active matrix 532, color filter 536, etc.

The DDIC 510 may be directly bonded to a back face of the backplane opposite to active matrix 532. In further embodiments, a chip-on-flex (COF) packaging technology may be used to integrate display element 540 with DDIC 510, optionally via a data selector (i.e., multiplexer) array (not shown) to form OLED display device 500. As used herein, the terms "multiplexer" or "data selector" may, in some examples, refer to a device adapted to combine or select from among plural analog or digital input signals, which are transmitted to a single output. Multiplexers may be used to increase the amount of data that can be communicated within a certain amount of space, time, and bandwidth.

As used herein, "chip-on-flex" (COF) may, in some examples, refer to an assembly technology where a microchip or die, such as an OLED chip, is directly mounted on and electrically connected to a flexible circuit, such as a direct driver circuit. In a COF assembly, the microchip may avoid some of the traditional assembly steps used for individual IC packaging. This may simplify the overall processes of design and manufacture while improving performance and yield.

In accordance with certain embodiments, assembly of the COF may include attaching a die to a flexible substrate, electrically connecting the chip to the flex circuit, and encapsulating the chip and wires, e.g., using an epoxy resin to provide environmental protection. In some embodiments, the adhesive (not shown) used to bond the chip to the flex substrate may be thermally conductive or thermally insulating. In some embodiments, ultrasonic or thermosonic wire bonding techniques may be used to electrically connect the chip to the flex substrate.

Figure 6:
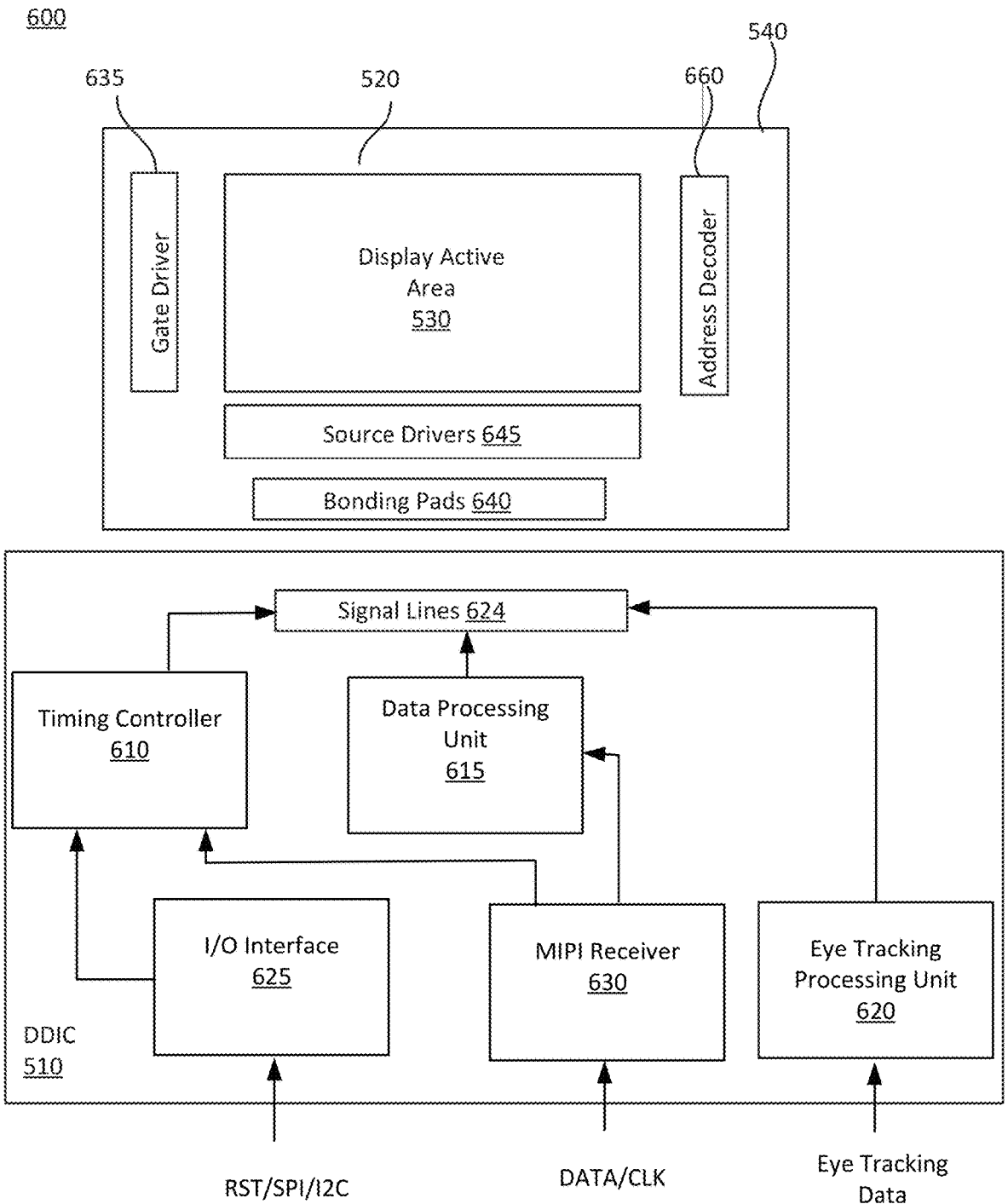
FIG. 6 is a schematic view of an OLED display device, according to some embodiments.

FIG. 6 is a schematic view of an OLED display device 600 according to some embodiments. The OLED display device 600 may include, among other components, the DDIC 510 and the display element 540. The display element 540 may be an integrated circuit including the backplane 520, the display active area 530, bonding pads 640, and a control circuit for controlling the display active area 530. The control circuit may include source drivers 645, a gate driver 635, and an address decoder 660. The DDIC 510 may include a timing controller 610, a data processing circuit 615, an eye tracking processing unit 620, an input/output (I/O) interface 625, a mobile industry processor interface (MIPI) receiver 630, and signal lines 624. In other embodiments, one or more components of the DDIC 510 may be disposed in the display element 540.

The timing controller 610 may be configured to generate timing control signals for the gate driver 635, the source drivers 645, the address decoder 660, and other components in the display element 540. The timing control signals may include a clock, a vertical synchronization signal, a horizontal synchronization signal, and a start pulse. However, timing control signals provided from the timing controller 610 according to embodiments of the present disclosure are not limited thereto.

The data processing unit 615 may be configured to receive image data DATA from the MIPI receiver 630 and convert the data format of the image data DATA to generate data signals input to the source drivers 645 for displaying images in the display active area 530.

The eye tracking processing unit 620 receives eye tracking data from the eye tracking system (e.g., eye tracker 170) and determines a gaze region of a user's eye 220 using the eye tracking data. The gaze region refers to a portion of the display active area that the user's eye 220 is focused on. Based on the gaze region, the eye tracking processing unit 620 identifies one or more rows and one or more columns corresponding to the gaze region. The identified one or more rows and one or more columns may be provided to the source drivers 645 and the address decoder 660 to be further processed and used for dynamically setting duty cycles of the pixels in the display active area 530.

The I/O interface 625 is a circuit that receives control signals from other sources and sends operation signals to the timing controller 610. The control signals may include a reset signal RST to reset the display element 540 and signals according to serial peripheral interface (SPI) or inter-integrated circuit (I2C) protocols for digital data transfer. Based on the received control signals, the I/O interface 625 may process commands from a system on a chip (SoC), a central processing unit (CPU), or other system control chip.

The MIPI receiver 630 may be a MIPI display serial interface (DSI), which may include a high-speed packet-based interface for delivering video data to the pixels in the display active area 530. The MIPI receiver 630 may receive image data DATA and clock signals CLK and provide timing control signals to the timing controller 610 and image data DATA to the data processing unit 615.

The display active area 530 may include a plurality of pixels (e.g., m rows by n columns) with each pixel including a plurality of subpixels (e.g., a red subpixel, a green subpixel, a blue subpixel). Each subpixel may be connected to a gate line and a data line and driven to emit light according to a data signal received through the connected data line when the connected gate line provides a gate-on signal to the subpixel. The display active area 530 may include a plurality of latches that each corresponds to a pixel and control light emission of the pixel. During a display frame, a latch associated with a pixel may be programmed with a duty cycle for emitting light based on whether the pixel is in the gaze region or the non-gaze region. Details on operating the display active area 530 is described below with respect to FIGS. 8 and 9.

The backplane 520 may include conductive traces for electrically connecting the pixels in the display active area 530, the gate driver 635, the source drivers 645, the bonding pads 640, and the address decoder 660. The bonding pads 640 are conductive regions on the backplane 520 that are electrically coupled to the signal lines 624 of the DDIC 510 to receive timing control signals from the timing controller 610, data signals from the data processing unit 615, and eye tracking information from the eye tracking processing unit 620. The eye tracking information indicates which portion of the display active area 530 the user's eye is gazing at. The bonding pads 640 are connected to the source drivers 645, the gate driver 635, and address decoder 660 as well as other circuit elements in the backplane 520. In the embodiment illustrated in FIG. 6, the DDIC 510 generates data signals and timing control signals and transmits the signals to the bonding pads 640 of the display element 540. However, in other embodiments, the timing controller 610 and/or the data processing unit 615 may be in the display element 540 instead of the DDIC 510. When the timing controller 610 and/or the data processing unit 615 are on the display element 540, there may be fewer bonding pads 640 since the data signals and timing control signals may be directly transmitted to the corresponding component without a bonding pad 640.

The gate driver 635 may be connected to a plurality of gate lines and provide gate-on signals to the plurality of gate lines at appropriate times. In some embodiments, each subpixel in the display active area 530 may be connected to a gate line. For a given subpixel, when the subpixel receives a gate-on signal via the corresponding gate line, the subpixel can receive a data signal to emit light.

The source drivers 645 may receive data signals from the data processing unit 615 and provide the data signals to the display active area 530 via data lines. Each of the source drivers 645 may be connected to a column of pixels via a data line, each pixel including a plurality of subpixels. The source drivers 645 may also receive eye tracking information from the eye tracking processing unit 620 that identifies one or more columns of pixels corresponding to the gaze region and one or more columns of pixels corresponding to the non-gaze region. Based on the eye tracking information, the source drivers 645 may provide latch selection signals to the plurality of latches in the display active area 530 used to program duty cycles of the pixels. Each source driver 645 may output latch selection signals to a column of latches via a latch selection line.

The address decoder 660 receives eye tracking information from the eye tracking processing unit 620 that identifies one or more rows of pixels corresponding to the gaze region and one or more rows of pixels corresponding to the non-gaze region. The address decoder 660 is connected to the plurality of latches in the display active area 530 via enable signal lines, where a row of latches is connected to the same enable signal line. For a given row of latches, the address decoder 660 outputs an enable signal that turns the row of latches on or off based on the eye tracking information. When the enable signal is at a high state, the row of latches are turned on and can be programmed according to the latch selection signals from the source drivers 645. When the enable signal is at a low state, the row of latches are turned off and output is latched to the previous state regardless of the latch selection signals. In some embodiments, there may be another address decoder 660 in the display element 540 to improve driving capability of the display element 540. For example, a first address decoder 660 may provide enable signals to a left half of the display active area 530 and a second address decoder 660 may provide enable signals to a right half of the display active area 530.

FIGS. 7A and 7B illustrate example gaze regions 710 and non-gaze regions 720, according to some embodiments. The display active area 530 may be divided into a plurality of regions 730, each region 730 represented as a box. Each region includes a plurality of pixels that are controlled with the same duty cycle. In the embodiment illustrated in FIGS. 7A and 7B, the display active area 530 is divided into sixteen regions 730. However, in alternative embodiments, the display active area 530 may be divided into fewer or additional regions 730. When a frame is displayed in the display active area 530, a user's eyes may focus on a portion of the display active area 530 referred to as a gaze region 710. Because human eyes are less sensitive to luminance in a non-gaze region 720 outside of the gaze region 710 where the eyes are focused, pixels in the non-gaze region 720 may be operated to emit light at a lower brightness compared to pixels in the gaze region 710 without the user noticing a degraded image quality. Further, the pixels in the gaze region 710 may be turned on for a shorter time to emit light with higher brightness whereas the pixels in the non-gaze region 720 are turned on for a longer time to emit light with lower brightness.

For example, as illustrated in FIG. 7A, the user may focus on a first gaze region 710A at the center of the display active area 530 during a first display frame. Since the user is focused on the first gaze region 710A, the user's eyes are more sensitive to the image quality in the first gaze region 710A compared to a first non-gaze region 720A outside of the first gaze region 710A. To reduce power consumption and increase lifespan of the pixels, the display device 600 may be operated such that pixels in the first gaze region 710A emit light at a first duty cycle while pixels in the first non-gaze region 720A emit light at a second duty cycle greater than the first duty cycle, where pixels in the first gaze region 710A are driven with higher current to be brighter than the pixels in the first non-gaze region 720A. This operation method allows the user to experience high quality images with reduced power consumption.

Although a first region (e.g., center region) may constantly be operated at higher brightness compared to a second region (e.g., peripheral region) of the display active area 530, such an operation scheme would increase current density in the pixels of the first region due to higher brightness in the center region and cause the lifetime of the pixels in the center region to be shorter than the lifetime of the pixels in the peripheral region. Further, as frames are displayed in the display active area 530, a user's eyes may move and focus on different parts of the display active area 530. When the user's eyes are focused on the peripheral region, the user may notice the lower image quality and have a less satisfactory viewing experience. In comparison, it may be advantageous to track the user's eyes and update the gaze region and non-gaze region on a frame by frame basis and operating pixels more evenly to improve the overall lifetime of the display active area 530 and reduce the overall power consumption.

In a second display frame, the user may focus on a second gaze region 710B at the upper right corner of the display active area 530 during a second display frame. Outside of the second gaze region 710B, there may be a second non-gaze region 720B and a third non-gaze region 720C. Because the user's eyes are focused on the second gaze region 710B, pixels in the second non-gaze region 720B and the third non-gaze region 720C may be operated at a duty cycle greater than the duty cycles of the second gaze region 710B and lower brightness compared to pixels in the second gaze region 710B. Since the second non-gaze region 720B is closer to the second gaze region 710B than the third non-gaze region 720C is to the second gaze region 710B, the second non-gaze region 720B may be operated at a lower duty cycle and higher brightness than the third non-gaze region 720C but higher duty cycle and lower brightness than the second gaze region 710B. In another embodiment, the second non-gaze region 720B and the third non-gaze region 720B may be operated at a same duty cycle and brightness.

Figure 8:
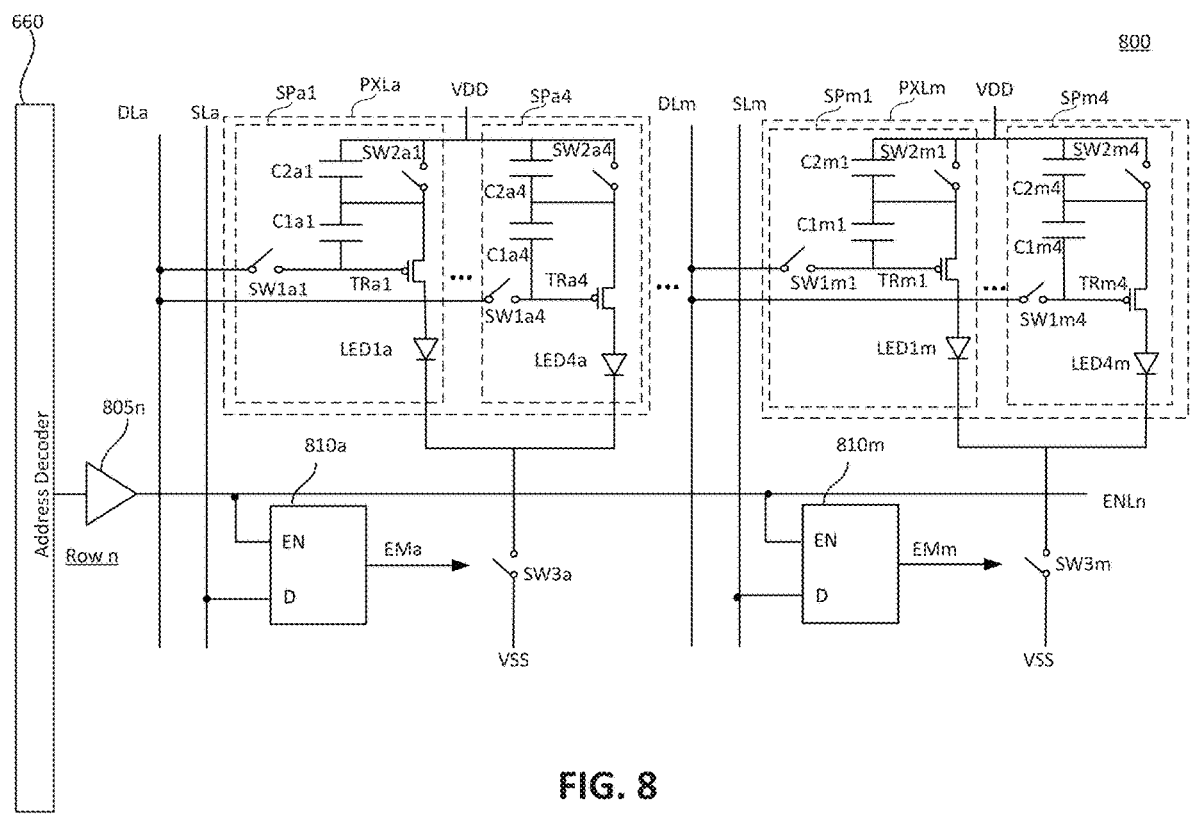
FIG. 8 is a circuit diagram of an OLED display device, according to some embodiments.

FIG. 8 is a circuit diagram 800 of an OLED display device, according to some embodiments. The display active area 530 includes a plurality of pixels PXL that are arranged into rows and columns. The circuit diagram 800 illustrate an example row n of the display active area 530 that includes m columns of pixels PXLa through PXLm. Each pixel PXL is associated with a latch 810 that is dynamically programmed with a duty cycle for the corresponding pixel PXL depending on whether the pixel PXL is in the gaze region 710 or in the non-gaze region 720 for a given display frame. Each pixel PXL may include a plurality of subpixels SP that are connected to a same data line DL. As an example, the pixel PXL structure is described with respect to a first pixel PXLa in further detail.

The first pixel PXLa includes a first subpixel SPa1, a second subpixel SPa2, a third subpixel SPa3, and a fourth subpixel SPa4, where the four subpixels are connected to a first data line DLa. Each subpixel SP (e.g., SPa1, SPa2, SPa3, SPa4) includes a first switch SW1 (e.g., SW1a1, SW1a2, SW1a3, SW1a4), a second switch (e.g., SW2a1, SW2a2, SW2a3, SW2a4), a first capacitor C1 (e.g., C1a1, C1a2, C1a3, C1a4), a second capacitor C2 (e.g., C2a1, C2a2, C2a3, C2a4), a transistor TR (e.g., TRa1, TRa2, TRa3, TRa4), and an LED (e.g., LED1a, LED2a, LED3a, LED4a). In a subpixel SP, a gate terminal of the transistor TR is connected to the first data line DLa through the first switch SW1. A first terminal of the transistor TR is connected to a first driving voltage VDD through the second switch SW2 and a second terminal of the transistor TR is connected to an anode of the LED. The first capacitor C1 is connected across the gate terminal and the first terminal of the transistor TR. The second capacitor C2 is connected in series with the first capacitor C1, and the second capacitor C2 is disposed between the first capacitor C1 and the first driving voltage VDD and across the second switch SW. In the first pixel PXLa, cathodes of all the LEDs (e.g., LED1a, LED2a, LED3a, LED4a) are connected to a second driving voltage VSS through the third switch SW3a. The third switch SW3a opens and closes according to an emission control signal EMa that is output by the latch 810a.

The source driver 645 provides data signals corresponding to the first pixel PXLa of row n via the first data line DLa. Since the subpixels SPa1, SPa2, SPa3, SPa4 in the first pixel PXLa share the first data line DLa, the first switches SW1a1, SW1a2, SW1a3, SW1a4 are closed sequentially such that only one of the first switches SW1a1, SW1a2, SW1a3, SW1a4 is closed at a given time. In a given subpixel SPa of the subpixels SPa1, SPa2, SPa3, SPa4, when the corresponding first switch of the first switches SW1a1, SW1a2, SW1a3, SW1a4 is closed, the corresponding first capacitor of the first capacitors C1a1, C1a2, C1a3, C1a4 is charged according to the data signal provided by the source driver 645 via the first data line DLa. While the first switches SW1a1, SW1a2, SW1a3, SW1a4 close and reopen to charge the first capacitors C1a1, C1a2, C1a3, C1a4, the second switches SW2a1, SW2a2, SW2a3, SW2a4 remain open to disconnect the transistors TRa1, TRa2, TRa3, TRa4 from the first driving voltage VDD. During an emission period during which the first pixel PXLa emits light, the first switches SW1a1, SW1a2, SW1a3, SW1a4 are opened and the second switches SW2a1, SW2a2, SW2a3, SW2a4 are closed to connect the first terminals of the transistors TRa1, TRa2, TRa3, TRa4 to the first driving voltage VDD. The third switch SW3a closes according to the emission control signal EMa output by the latch 810a, and the emission control signal EMa controls the duty cycle of the first pixel PXLa by controlling how long the third switch SW3a remains closed.

A latch 810 is programmed to output an emission control signal EM to control a third switch SW3 connected between the LED and second driving voltage VSS based on an enable input EN provided by the address decoder 660 and a data input D provided by the source driver 645. For a given display frame, the eye tracking processing unit 620 provides eye tracking information identifying columns of pixels PXL that correspond to the gaze region 710 to the source drivers 645 and provides eye tracking information identifying rows of pixels PXL that correspond to the gaze region 710 to the address decoder 660. Based on the eye tracking information, the address decoder 660 outputs enable signals to the enable input EN of latches 810 via enable signal lines ENL. Each enable signal line ENL is connected to a row of latches 810. For example, the latches 810a through 810m in row n are connected to an $n^{th}$ enable signal line ENLn through which the address decoder 660 outputs the enable signals that are provided as enable input EN to the row of latches 810a through 810m. The enable signal may be output by the address decoder 660 through a buffer 805n. Based on the eye tracking information, the source drivers 645 output latch selection signals to columns of latches 810 via selection lines SL. Latches 810 in the same row are connected to the same enable signal line ENL, and latches 810 in the same column are connected to the same selection line SL. When an enable input EN transmitted to a row of latches 810 through an enable signal line ENL is in a high state, the row of latches 810 may be turned on and programmed with updated duty cycles using the data input D. In contrast, when an enable input EN is in a low state, the row of latches 810 are not turned on and the duty cycles of the latches 810 remains latched to the previous state regardless of the data input D.

Figure 9:
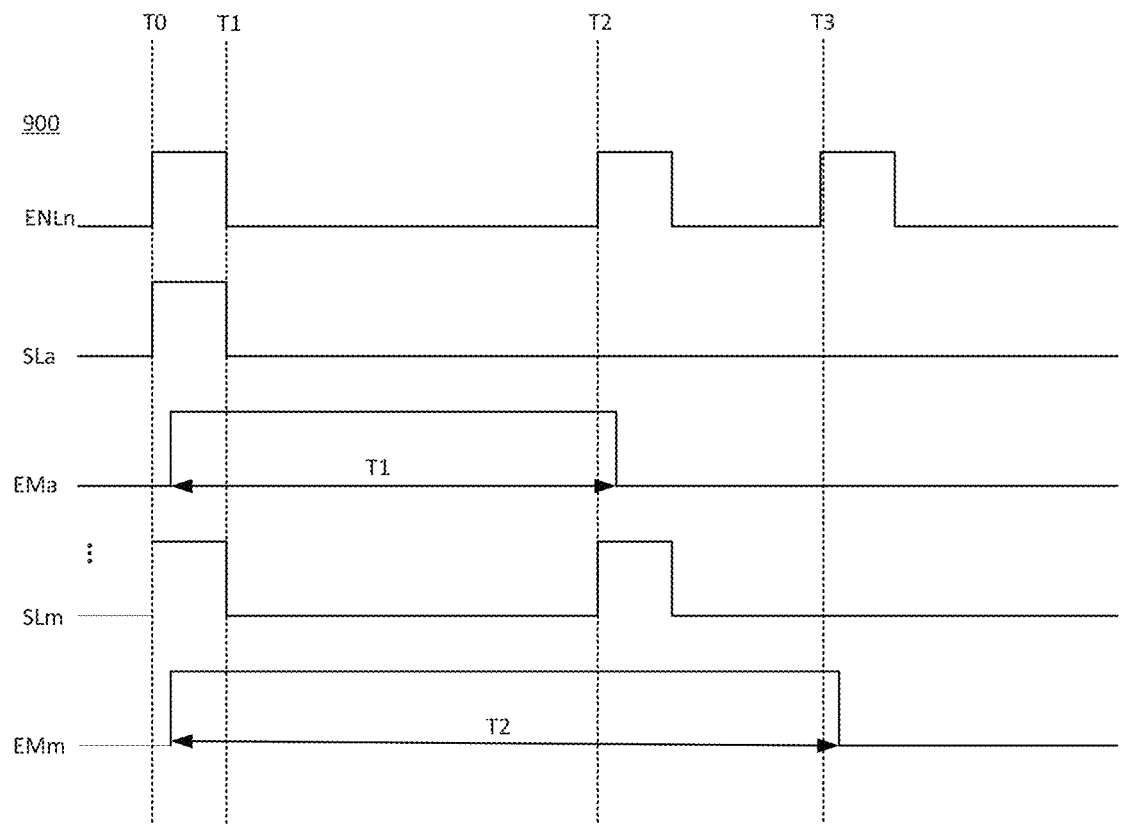
FIG. 9 is a timing diagram illustrating operation of an OLED display device, according to some embodiments.

FIG. 9 is a timing diagram 900 illustrating operation of an OLED display device, according to some embodiments. The timing diagram 900 illustrates an example method of dynamically programming duty cycles for a first latch 810a corresponding to a first pixel PXLa in row n and a mth latch 810m corresponding to a mth pixel PXLm in row n during a given display frame. The first latch 810a outputs a first emission control signal EMa to a third switch SW3a connected between the first pixel PXLa and the second driving voltage VSS, and the second latch 810m outputs a mth emission control signal EMm to a third switch SW3m connected between the mth pixel PXLm and the second driving voltage VSS. The first latch 810a and the mth latch 810m receive the same enable signal via the nth enable signal line ENLn. The first latch 810a receives a first latch selection signal via the first selection line SLa, and the mth latch 810m receives a mth latch selection signal via the mth selection line SLm. For simplicity, the enable signal provided to the nth enable signal line ENLn may be referred to as "enable signal ENLn," the first latch selection signal provided to the first selection line SLa may be referred to as "first latch selection signal SLa," and the mth latch selection signal provided to the mth selection line SLm may be referred to as "mth latch selection signal SLm."

In the example illustrated in FIG. 9, the first pixel PXLa is included in the gaze region 710, and the mth pixel PXLm is included in the non-gaze region 720. Thus, the first pixel PXLa is operated with a first duty cycle while the mth pixel PXLm is operated with a second duty cycle greater than the first duty cycle. That is, a duration T2 during which the mth emission control signal EMm is at a high state and causes the mth pixel PXLm to emit light is greater than a duration T1 during which the first emission control signal EMa is at the high state and causes the first pixel PXLa to emit light. When the emission control signal EM is at the high state, the third switch SW3 is closed, causing the corresponding pixel PXL to emit light. When the emission control signal EM is at the low state, the third switch SW3 of the pixel PXL is open, disconnecting the pixel PXL from the second driving voltage VSS and causing the pixel PXL to not emit light. Thus, the mth pixel PXLm emits light for a longer period than the first pixel PXLa in the illustrated display frame.

When the enable signal ENLn is set to the high state, the output emission control signal EM follows the D input from the latch selection signal SL. For example, when the enable signal ENLn is set to the high state at T0, the first latch selection signal SLa and the mth latch selection signal SLm are set to the high level, causing the first emission control signal EMa output by the first latch 810a and the mth latch 810m output by the mth emission control signal EMm to change to the high state. However, when the enable signal is set to the low state, the output emission control signal EM stays latched in its last state regardless of the latch selection signal SL. Therefore, when the nth enable signal line ENLn changes to the low state at T1 after the first emission control signal EMa and the mth emission control signal EMm are set to the high state, the first emission control signal EMa and the mth emission control signal EMm remain at the high state until T2. At T2, the enable signal ENLn changes to the high state and the first latch selection signal SLa remains at the low state. Accordingly, the first emission control signal EMa is set to the low state, and the first pixel PXLa stops emitting light. In contrast, at T1, the mth latch selection signal SLm is set to the high state when the nth signal line ENLn is set to the high state. This causes the mth emission control signal EMm to remain at the high state until T3 at which the enable signal ENLn is set to the high state but the mth signal line SLm is set to the low state. At T3, the mth emission control signal EMm follows the state of the mth latch selection signal SLm and changes to the low state, causing the mth pixel PXLm to stop emitting light.

Figure 10:
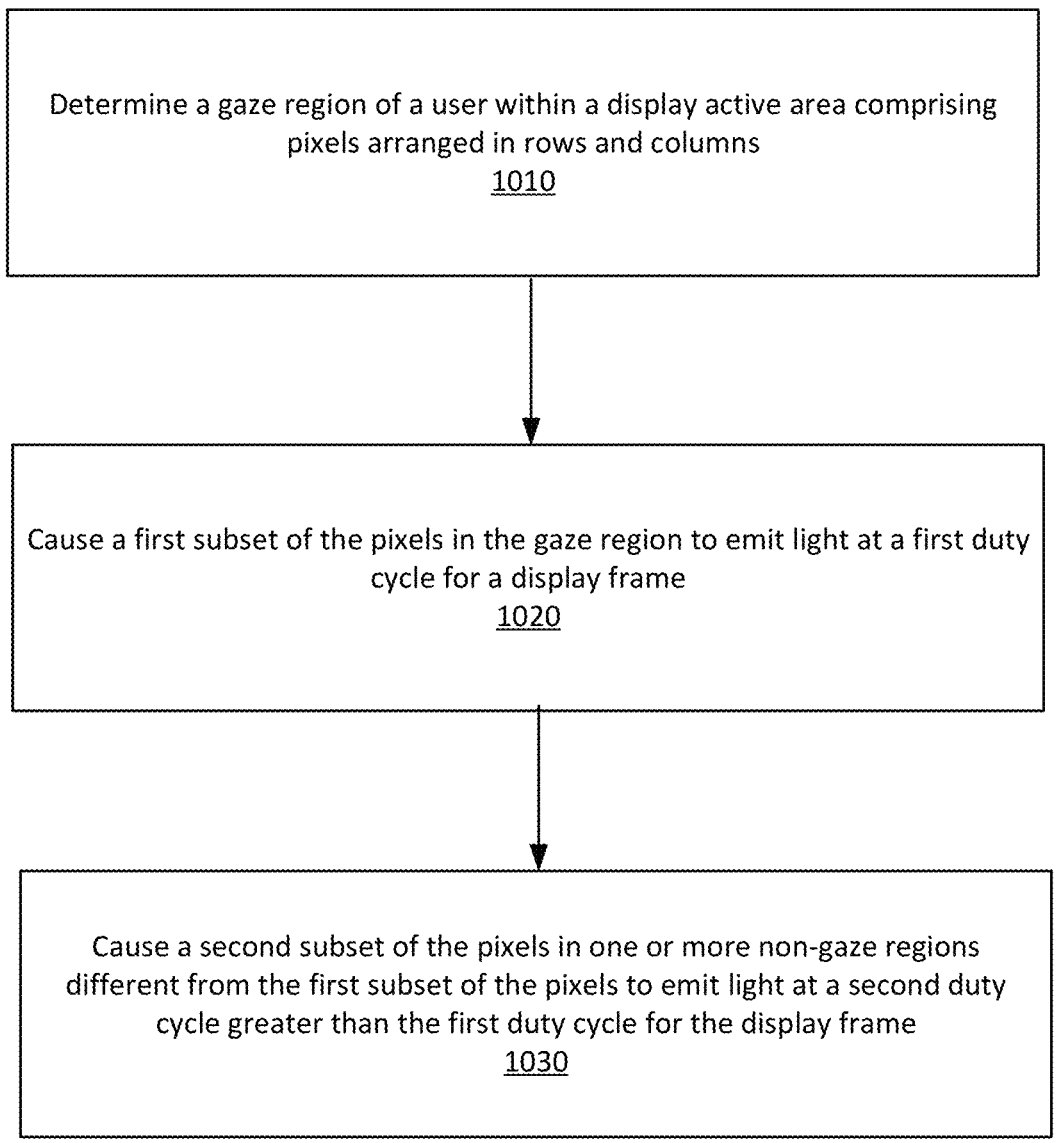
FIG. 10 is a flowchart illustrating an operation of an OLED display device according to some embodiments.

FIG. 10 is a flowchart illustrating an operation of an OLED display device according to some embodiments. An OLED display device determines 1010 a gaze region of a user within a display active area comprising pixels arranged in rows and columns. The gaze region may be determined using eye tracking information. The OLED display device causes 1020 a first subset of the pixels in the gaze region to emit light at a first duty cycle for a display frame. The OLED display device causes 1030 a second subset of the pixels in the non-gaze regions different from the first subset of the pixels to emit light at a second duty cycle greater than the first duty cycle for the display frame. The first subset of pixels in the gaze region is operated to emit light with greater brightness for a shorter period of time compared to the second subset of pixels in the non-gaze area that is operated to emit light with lower brightness for a longer period of time.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device, comprising:
   a display active area comprising pixels arranged in rows and columns; and
   a control circuit configured to control:
   a gaze region comprising a first subset of the pixels to operate with a first duty cycle for a display frame, and
   one or more non-gaze regions comprising a second subset of the pixels different from the first subset of the pixels to operate with a second duty cycle that is greater than the first duty cycle for the display frame.

2. The display device of claim 1, wherein the first subset of the pixels is operated to emit light with greater brightness than the second subset of the pixels during the display frame.

3. The display device of claim 1, further comprising an eye tracker configured to determine eye position of a user, the eye position corresponding to the gaze region.

4. The display device of claim 1, wherein the control circuit further comprises:
   an eye tracking processing circuit configured to generate eye tracking information indicating one or more rows of the pixels corresponding to the gaze region, and
   an address decoder coupled to the eye tracking processing circuit and configured to operate the one or more rows of the pixels corresponding to the gaze region according to the first duty cycle.

5. The display device of claim 1, wherein the control circuit further comprises:
   an eye tracking processing circuit configured to generate eye tracking information indicating one or more columns of the pixels corresponding to the gaze region, and
   a plurality of source drivers coupled to the eye tracking processing circuit and configured to operate the one or more columns of the pixels corresponding to the gaze region according to the first duty cycle.

6. The display device of claim 1, wherein the one or more non-gaze regions further comprise a third subset of the pixels different from the first subset and the second subset of the pixels, wherein the third subset of the pixels operates with a third duty cycle that is greater than the first duty cycle but less than the second duty cycle for the display frame.

7. The display device of claim 1, wherein the display active area includes a plurality of latches, each latch of the plurality of latches configured to set duty cycles for one or more pixels at a row and a column of the display active area by outputting an emission control signal based on an enable signal that selects the row and a latch selection signal that selects the column.

8. The display device of claim 7, wherein a first latch of the plurality of latches receives a first enable signal and a first latch selection signal and outputs a first emission control signal to a first switch connected between one or more pixels from the first subset of pixels and a ground voltage, the first switches configured to close when the first emission control signal is high and open when the first emission control signal is low, and
   wherein a second latch of the plurality of latches receives the first enable signal and a second latch selection signal and outputs a second emission control signal to a second switch connected between one or more pixel from the second subset of pixels and the ground voltage, the second switch configured to close when the second emission control signal is high and open when the second emission control signal is low.

9. The display device of claim 8, wherein the first emission control signal is set to high at a first time at which the first enable signal and the first latch selection signal both change from low to high.

10. The display device of claim 9, wherein the first emission control signal is set to high until a second time at which the first enable signal changes from low to high and the first latch selection signal remains at low.

11. The display device of claim 10, wherein the second emission control signal is set to high at the first time at which the first enable signal and the second latch selection signal both change from low to high.

12. The display device of claim 11, wherein the second emission control signal is set to high until a third time at which the first enable signal changes from low to high and the second latch selection signal remains at low, wherein the third time is subsequent to the second time.

13. A method comprising:
   determining a gaze region of a user within a display active area comprising pixels arranged in rows and columns;
   causing a first subset of the pixels in the gaze region to emit light at a first duty cycle for a display frame; and
   causing a second subset of the pixels in one or more non-gaze regions different from the first subset of the pixels to emit light at a second duty cycle greater than the first duty cycle for the display frame.

14. The method of claim 13, wherein the first subset of the pixels is operated to emit light with greater brightness than the second subset of the pixels during the display frame.

15. The method of claim 13, wherein determining the gaze region further comprises:
   determining one or more rows and one or more columns of the pixels corresponding to the gaze region.

16. The method of claim 13, further comprising:
   causing a third subset of the pixels in the one or more non-gaze regions different from the first subset and second subset of the pixels to emit light at a third duty cycle greater than the first duty cycle but less than the second duty cycle for the display frame.

17. The method of claim 13, wherein the display active area includes a plurality of latches, each latch of the plurality of latches configured to set duty cycles for one or more pixels at a row and a column of the display active area by outputting an emission control signal based on an enable signal that selects the row and a latch selection signal that selects the column.

18. The method of claim 17, wherein a first latch of the plurality of latches receives a first enable signal and a first latch selection signal and outputs a first emission control signal to a first switch connected between one or more pixels from the first subset of pixels and a ground voltage, the first switches configured to close when the first emission control signal is high and open when the first emission control signal is low, and
   wherein a second latch of the plurality of latches receives the first enable signal and a second latch selection signal and outputs a second emission control signal to a second switch connected between one or more pixel from the second subset of pixels and the ground voltage, the second switch configured to close when the second emission control signal is high and open when the second emission control signal is low.

19. An electronic device comprising:
   a display active area comprising pixels arranged in rows and columns; and
   a control circuit configured to control:
      a gaze region comprising a first subset of the pixels to operate with a first duty cycle for a display frame, and
      one or more non-gaze regions comprising a second subset of the pixels different from the first subset of the pixels to operate with a second duty cycle that is greater than the first duty cycle for the display frame.

20. The electronic device of claim 17, wherein the electronic device is a head-mounted display (HMD).

* * * * *